(12) United States Patent
Davis

(10) Patent No.: US 7,091,833 B1
(45) Date of Patent: Aug. 15, 2006

(54) AUTOMOBILE THEFT DETERRENT SYSTEM

(76) Inventor: Everton Davis, 6121 Glade Ave., B109, Woodland Hills, CA (US) 91367

( * ) Notice: Subject to any disclaimer, the term of this patent is extended or adjusted under 35 U.S.C. 154(b) by 80 days.

(21) Appl. No.: 10/830,554

(22) Filed: Apr. 23, 2004

(51) Int. Cl.
B60R 25/10 (2006.01)

(52) U.S. Cl. .............................. 340/426.1; 340/426.28; 348/148

(58) Field of Classification Search ............ 340/426.1, 340/426.11, 426.26, 426.13, 426.14, 426.16, 340/426.17, 426.18, 426.2, 426.27, 426.36, 340/426.28; 348/148, 153, 839, 118, 159, 348/151, 143
See application file for complete search history.

(56) References Cited

U.S. PATENT DOCUMENTS 5,760,848 A * 6/1998 Cho ........................... 348/839
6,542,182 B1 * 4/2003 Chutorash ................... 348/148
6,795,111 B1 * 9/2004 Mazzilli ...................... 348/148
6,940,397 B1 * 9/2005 Le Mire ................... 340/426.1
2004/0090525 A1 * 5/2004 Eichmann ................... 348/148

* cited by examiner

Primary Examiner—Anh V. La
(74) Attorney, Agent, or Firm—Goldstein Law Offices Pc

(57) ABSTRACT

An automobile theft deterrent system for providing still video images and continuously recorded video images of activities within the automobile and scenes external to the automobile. The system has a front video camera mounted in the front portion of the automobile, preferably against the rear surface of the rearview mirror, and an overhead video camera mounted on the automobile interior top surface, preferably adjacent to the overhead light. The front video camera points in the forward direction to outside of the automobile. The overhead video camera points downwardly from behind the one way mirror surface of the rear view mirror to view activities within the automobile. The images from both cameras are transmitted to a hand-held receiver device held by the automobile owner. The receiver has a viewing screen which enables the owner to view the images from the camera.

4 Claims, 3 Drawing Sheets

AUTOMOBILE THEFT DETERRENT SYSTEM

BACKGROUND OF THE INVENTION

This invention relates to an automobile theft deterrent system. More particularly, the invention relates to a theft deterrent system for use with an automobile in which video cameras are strategically mounted within the automobile for recording activity within and around said automobile. The recording information is transmitted to a receiver device held by the owner for viewing of same.

The rate of automobile theft has unfortunately increased over the past decade. In an attempt to combat these thefts, many cars are equipped with audible alarms that serve to signal the automobile owner and others in the immediate area to the possible unlawful entry into the automobile. However, it has become very common to hear such alarms causing the alarms to often go unnoticed and undetected. Thus, it is very difficult to recover the car or the thief thereof. Because of the high rate of unsolved automobile thefts, the recording of activities surrounding and within the car can assist law enforcement officials in tracking the stolen car and apprehending the thief.

Thus, there exists a need for a theft deterrent system comprising a series of cameras which will provide still images and continuously recorded video images of scenes inside and external to the automobile for aiding in the recovery of stolen cars. The system may be easily installed in an automobile and serve to transmit information from the car to a hand-held receiver device. The receiver device may be held by the owner of the automobile or positioned in any location outside of the car.

In addition, there exists a need for effective monitoring of the rear portions of the automobile interior while driving. Children can get themselves into a great deal of trouble while a parent is driving just a few feet away. The present invention can allow the user/driver to effectively monitor children seated rearwardly within the automobile, to ensure their safety.

While the units currently available above may be suitable for the particular purpose employed, or for general use, they would not be as suitable for the purposes of the present invention as disclosed hereafter.

SUMMARY OF THE INVENTION

In view of the foregoing disadvantages inherent in the prior art, the present invention provides an improved automobile theft deterrent system. As such, the general purpose of the present invention, which will be described subsequently in greater detail, is to provide a new and improved automobile theft deterrent system which has all the advantages of the prior art and none of the disadvantages.

To attain this, the present invention essentially comprises an automobile theft deterrent system for providing still video images and continuously recorded video images of activities within the automobile and scenes external to the automobile. The system has a front video camera mounted in the front portion of the automobile, preferably against the rear surface of the rearview mirror, and an overhead video camera mounted within the rearview mirror, behind a one-way mirror surface. The front video camera points in the forward direction to video scenes outside of the automobile. The images from both cameras are transmitted to a receiver device held by the automobile owner. The receiver device has a viewing screen which enables the owner to view the images from the camera.

It is an object of the invention to produce an automobile theft deterrent system which is capable of transmitting and recording still and video images of the activities inside and the scenes external to the vehicle for the purpose of detecting the location of the automobile, as well as the current driver thereof. Accordingly, the system comprises a plurality of cameras strategically positioned within the automobile to afford an overall view of the interior. The images taken with the cameras are transmitted to a hand-held receiver device for viewing.

It is a further object of the invention to produce an automobile theft deterrent system which enables the owner of the automobile to have continuous surveillance of the activities within the automobile. Accordingly, the images recorded are transmitted to a hand-held receiver device that may be viewed by the car owner. Further, the receiver device may be used to control the direction of the cameras to observe different view angles within the automobile.

It is a still further object of the invention to provide an automobile theft deterrent system that enables a user to supervise the automobile interior while driving. Accordingly, a dashboard screen is provided that allows the user to view events within the interior using the overhead video camera.

It is yet a further object of the invention to allow a user to view the interior of her automobile before unlocking the safe. Accordingly, the user can view the automobile interior using the hand-held receiver while still a safe distance from the vehicle.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

REFERENCE NUMERALS

Figure 1:
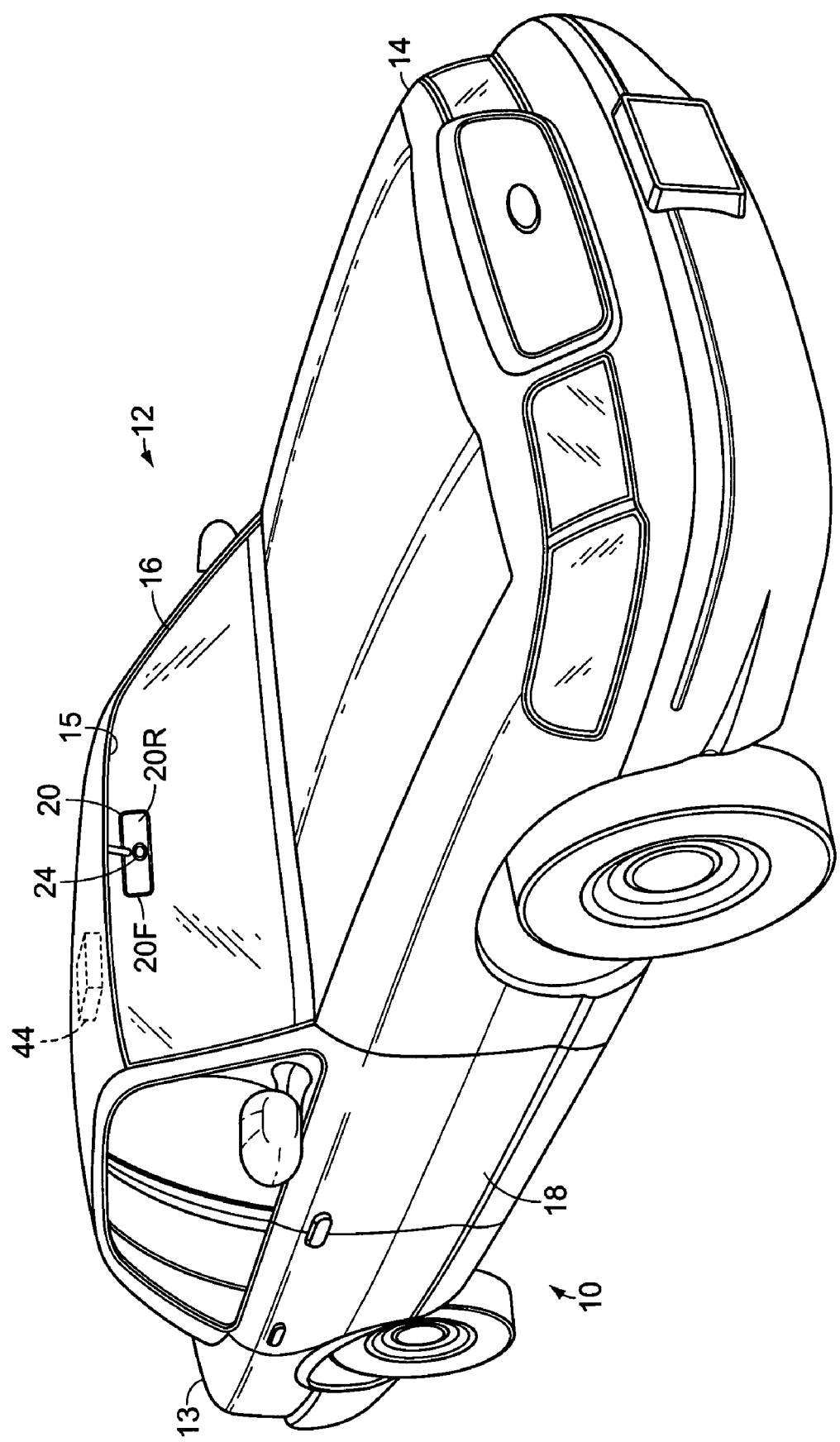
FIG. 1 is a perspective view of an automobile with the automobile theft deterrent system installed therein.

10 automobile theft deterrent system
12 automobile
13 automobile rear portion
14 automobile front portion
15 automobile top interior surface
16 automobile front windshield
18 automobile door
18H automobile door handle
20 automobile rearview mirror
20F rearview mirror front surface 20R rearview mirror rear surface
21 rearview mirror one way surface
24 front video camera
26 overhead video camera
28 receiver device
30 viewing screen
32 speaker
34 operating buttons
35 scroll wheel
36 direction controller
37 transceiver
38 video recorder
39 dashboard screen
40 automobile electric power source
42 automobile ignition system
44 sensor

DETAILED DESCRIPTION OF THE PREFERRED EMBODIMENTS

FIGS. 1–4 illustrate an automobile theft deterrent system 10 installed within an automobile 12. The automobile theft deterrent system 10 of the present invention provides still images of activity within the automobile, as well as recorded video images of the scenes external to the automobile. In the event of a theft of the automobile 12, the recorded still and video images can be used to establish the location of the automobile, as well as the driver. In general, however, the system 10 allows the user to remotely view the automobile surroundings and its interior.

The automobile 12 generally has an interior having a front portion 14 wherein a driver and a passenger may sit and a top interior surface 15. The front portion 14 has a front windshield 16 and at least one pair of opposed doors 18 on either side of the windshield 16. A rear view mirror 20 is positioned in the front portion 14, said mirror 20 having a mirrored front surface 20F and a rear surface 20R. The theft deterrent system 10 essentially comprises a plurality of cameras strategically positioned within the automobile 12 and a hand-held receiver device 28 to which the recorded images are transmitted.

Figure 4:
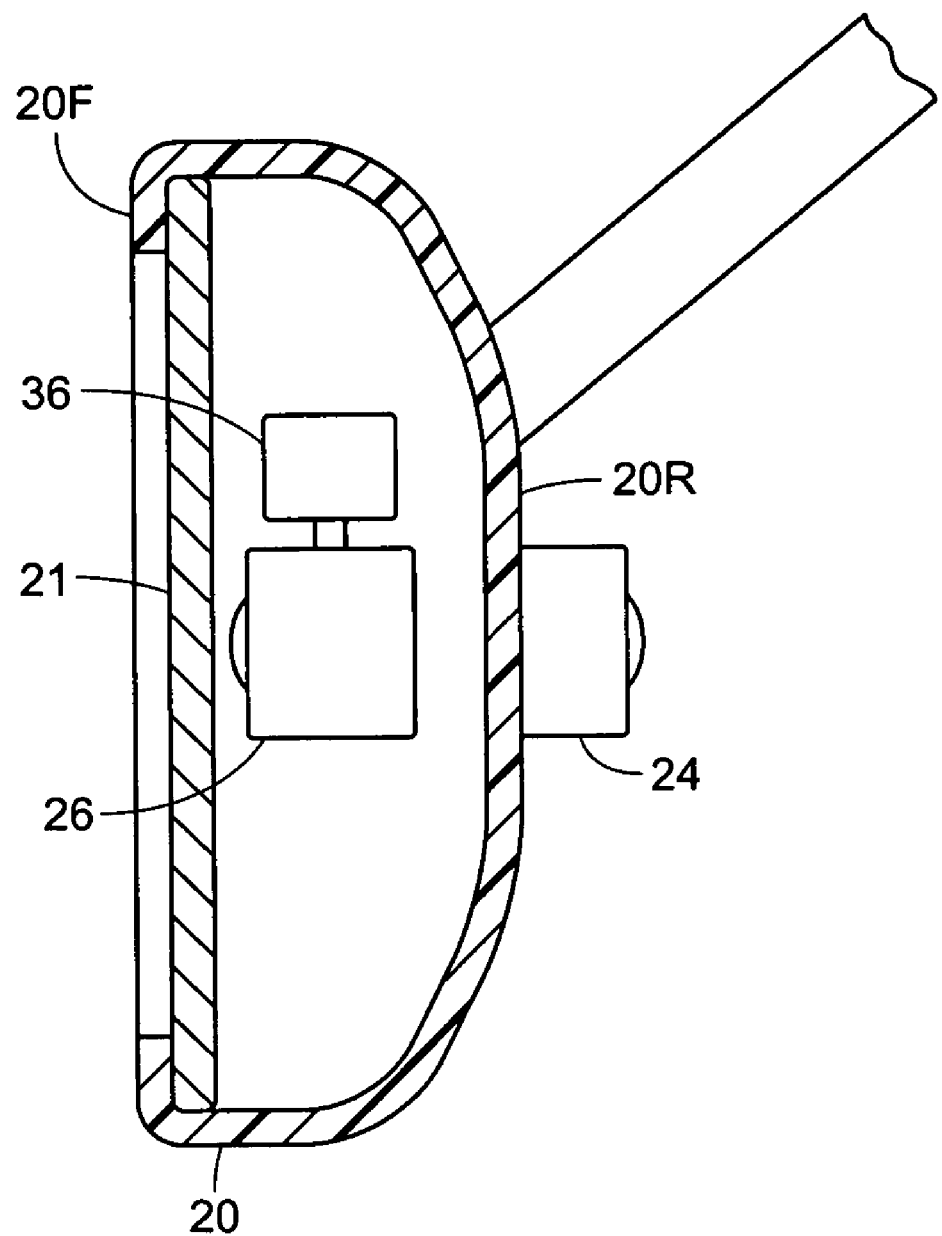
FIG. 4 is a side elevational view with parts broken away, illustrating the front video camera mounted to the rearview mirror, and the overhead video camera mounted inside the rearview mirror, behind a one-way mirror surface.

Referring to FIG. 1, a front video camera 24 is mounted inside the automobile 12 in the automobile front portion 14, preferably positioned on the rear surface 20R of the rear view mirror 20 and pointing in the forward direction through the front windshield 16. This front video camera 24 is primarily utilized in generating video images of the events occurring in front of the automobile 12. Referring to FIG. 4, an overhead video camera 26 is mounted inside the rearview mirror adjacent to the front surface 20F. The rearview mirror includes a one-way mirror surface 21, which allows the overhead video camera 26 to view the vehicle interior from a concealed location—within the rearview mirror 20. This overhead video camera 26 generally points downward to generate video images of activities within the automobile 12, including capturing images of people entering the automobile 12 through one of the doors 18.

The cameras 24, 26 may be mounted to their respective surfaces by means of a fastening device, namely an adhesive or a patch of hook and loop fasteners. It should be noted that any other mounting means as would be appreciated by those skilled in the art may be utilized in securing the cameras 24, 26 to surfaces in the automobile 12.

Figure 2:
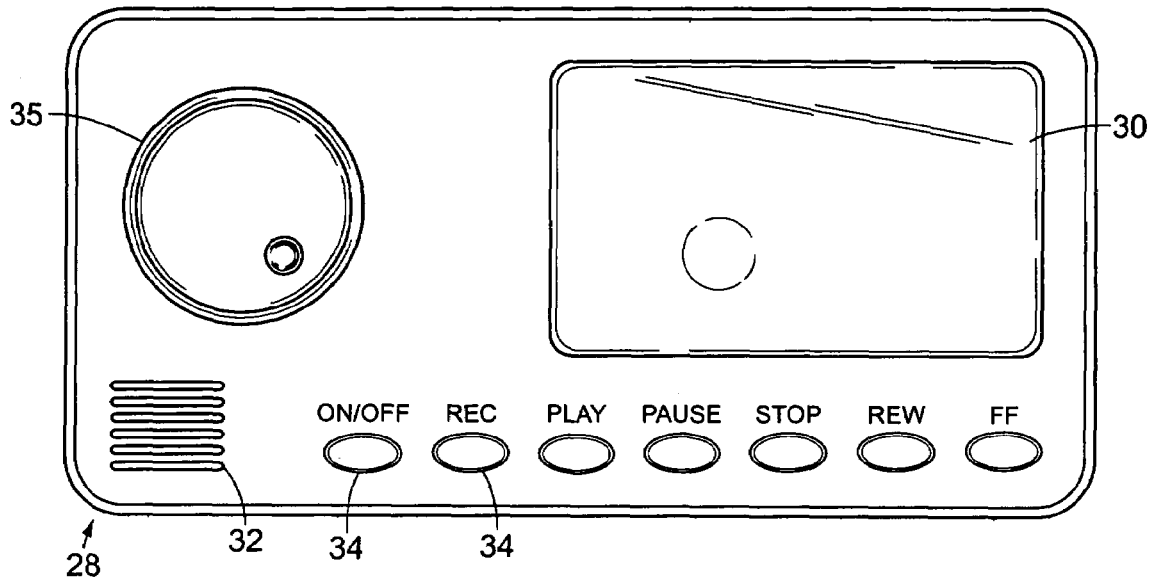
FIG. 2 is a front elevational view of the receiver device, displaying an image from one of the cameras.

Referring to FIG. 2, the receiver device 28 receives images generated and transmitted by the front video camera 24 and the overhead video camera 26. Each of the cameras 24, 26 can capture still images or to record continuously. The receiver device 28 has a viewing screen 30, a speaker 32, a plurality of operating buttons 34, and a direction controller 36 which may be used to transmit commands to the cameras 24, 26. The operating buttons 34 include, but are not limited to, "on/off", "rec", "play", "pause", "stop", "rew", and "ff". These buttons 34 control operation of the cameras 24, 26 accordingly to the plain meaning of these functions. Other functions can be implemented as well, including allowing the user to capture still and continuous images, and to view the overhead camera, front camera, and review previously recorded images. Thus, the automobile owner may monitor the activities inside or surrounding the automobile 12 through the images transmitted by the cameras 24, 26 to the receiver device 28 and displayed on the viewing screen 30. Further, the direction in which the cameras 24, 26 are directed may be altered by manipulating the direction controller 36. By way of example, the overhead video camera 26 may be altered using a scroll wheel 35, so that the user can "pan" or orient the camera to view the entire interior. The scroll wheel 35 allows the user to steer the video camera.to view the automobile front portion 14 or the automobile rear portion 13. In addition, the viewing screen 30 may be configured to selectively provide a split image—simultaneously providing views of both the automobile interior and exterior. Still further, the receiver device 28 has a microphone 32 for detecting ambient audio.

Additionally, a sensor 44 may be positioned within the automobile to detect an attempted break-in, so that the system 10 can take appropriate action to record such activities. Alternatively, sensors can be mounted on the exterior of each of the automobile doors 18, preferably in close proximity to the door handles 18H. Thus, upon touching the door handle 18H, the corresponding sensor 44 positioned on that door 18 triggers the operation of the cameras 24, 26 inside the automobile 12.

The transmission range of the vehicle should be maximized in order to provide the greatest ability of the user to monitor the vehicle using the receiver 28, even when the vehicle has become separated from the user by several miles. A useable viewing range of two to five miles is preferred. The transmission range, however, geographical features in the environment of both the receiver and the automobile, and government regulations.

Figure 3:
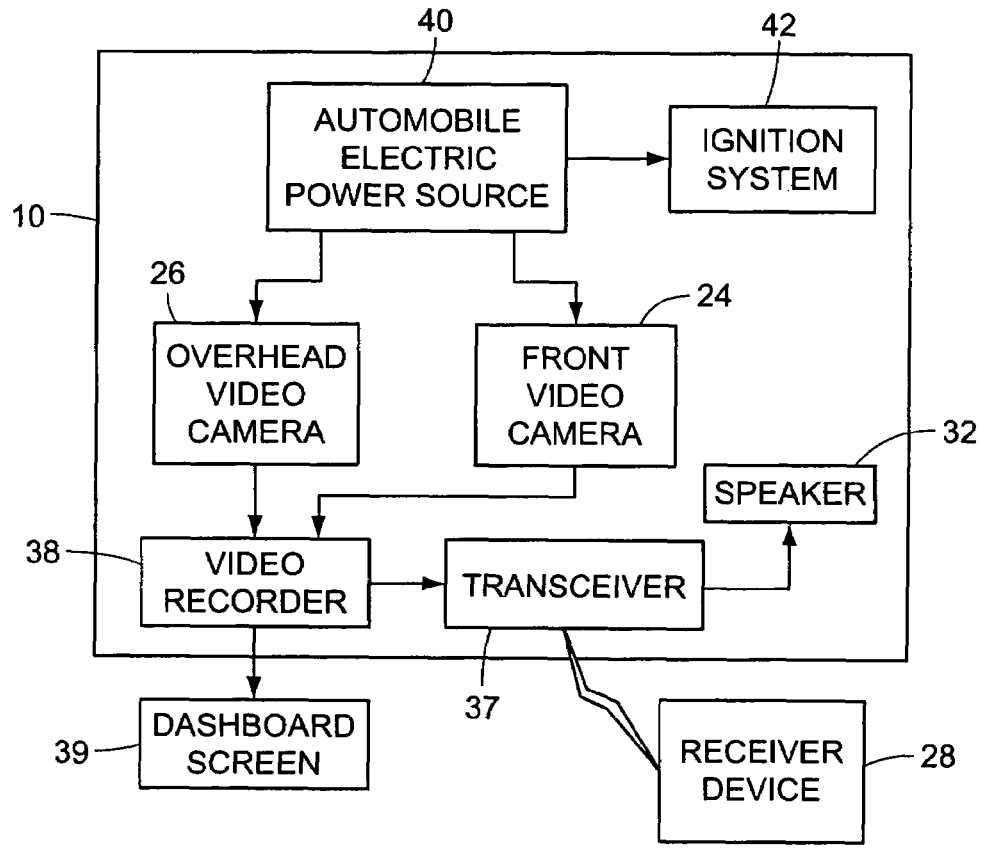
FIG. 3 is a block diagram of the automobile theft deterrent system of the present invention.

FIG. 3 schematically illustrates the automobile theft deterrent system 10 comprising two video recorders 38, each connected to respective video cameras 24, 26 to record the video images generated by the cameras 24, 26. Each of the video cameras 24, 26 produces a video signal that is transmitted by respective video cables to a video recorders 38—if housed within the automobile, or transmitted by radio frequency (RF) transmission if housed within the receiver 28. The cameras 24, 26 and the recorder 38 may be electrically connected to the automobile's electric power source 40 such that the cameras 24, 26 and recorders 38 are automatically activated upon the turning on the automobile's ignition system 42 and deactivated as the automobile's ignition system 42 is turned off. In this manner, the theft deterrent system 10 enables videotaping of the views in the front portion 14 rear portion 13 of the automobile 12, continuously and automatically during operation of the automobile 12. Alternatively, the cameras 24, 26 and their respective recorders 38 may be turned on and off through the operating buttons 34 on the receiver device 28. Further, each camera 24, 26 may have an independent power source, so as to continue operating even if they are disconnected from the vehicle's electric power source 40.

A transceiver 38 is in communication with the video recorder 38, so as to allow video images to be transmitted to the receiver from the video cameras 24, 26 and from the recorder 38. In addition, a speaker 33 is located within the interior of the automobile. Accordingly, the user can provide an audible message using the microphone 32, which is sent to the automobile, and is recreated by the speaker 33. Thus, the user can send a warning to a thief within the automobile, or any other person that is within the automobile.

As to the manner of usage and operation of the present invention, the same should be apparent from the above disclosure, and accordingly no further discussion relative to the manner and usage and operation of the present invention shall be described.

It should be noted that the theft deterrent system 10 may be utilized in any type of automobile, including trucks. The invention is illustrated by example in the drawing figures, and throughout the written description. It should be understood that numerous variations are possible, while adhering to the inventive concept. Such variations are contemplated as being a part of the present invention.

What is claimed is:

1. An automobile theft deterrent system, installed within an automobile having an interior, a rearview mirror having a one way mirror surface, an automobile interior light, and an ignition system, comprising:

an overhead video camera, mounted within the rearview mirror and oriented toward the one way mirror surface for viewing the interior of the automobile therethrough;

a speaker located within the automobile interior;

at least one video recorder, for recording images from the overhead video camera; and a hand-held receiver, having a viewing screen and operating buttons, for receiving and selectively viewing video from the overhead video camera and video recorder on the view screen by using the operating buttons, the hand-held receiver having a microphone, for selectively detecting an audible message from the user and providing said audible message within the automobile interior using the speaker; and a transceiver, located within the automobile for transmitting video images from the camera and recorder to the hand-held receiver, and for receiving audible messages from the microphone and providing said messages to the speaker.

2. The automobile theft deterrent system as recited in claim 1, further comprising a directional controller attached to the overhead video camera for orienting the overhead video camera to view various portions of the automobile interior, and wherein the hand-held receiver further comprises a scroll wheel which is rotated to control the orientation of the overhead video camera.

3. The automobile theft deterrent system as recited in claim 1, further comprising a theft sensor mounted to the automobile, for selectively activating the video cameras.

4. The automobile theft deterrent system as recited in claim 2, further comprising a dashboard screen, for allowing a driver of the automobile to view the rear portion of the automobile using the overhead camera.

* * * * *